(12) United States Patent
Kozintsev et al.

(10) Patent No.: US 10,156,976 B2
(45) Date of Patent: Dec. 18, 2018

(54) SYSTEM AND METHOD IN MANAGING LOW-LATENCY DIRECT CONTROL FEEDBACK

(71) Applicant: SAMSUNG DISPLAY CO., LTD., Yongin, Gyeonggi-Do (KR)

(72) Inventors: Igor Kozintsev, San Jose, CA (US); Ning Lu, Saratoga, CA (US)

(73) Assignee: Samsung Display Co., Ltd., Yongin-si (KR)

( * ) Notice: Subject to any disclaimer, the term of this patent is extended or adjusted under 35 U.S.C. 154(b) by 196 days.

(21) Appl. No.: 14/601,139

(22) Filed: Jan. 20, 2015

(65) Prior Publication Data

US 2015/0212685 A1     Jul. 30, 2015

Related U.S. Application Data

(60) Provisional application No. 61/933,794, filed on Jan. 30, 2014.

(51) Int. Cl.
*G06F 3/0488* (2013.01)
*G06T 11/20* (2006.01)
(Continued)

(52) U.S. Cl.
CPC .......... *G06F 3/0488* (2013.01); *G06F 3/0416* (2013.01); *G06F 3/0484* (2013.01);
(Continued)

(58) Field of Classification Search
None
See application file for complete search history.

(56) References Cited

U.S. PATENT DOCUMENTS 9,384,523 B1 * 7/2016 Penner ............. G06F 9/48
2009/0184972 A1   7/2009 Weybrew et al.
(Continued)

FOREIGN PATENT DOCUMENTS

CN     101313270 A    11/2008
CN     101464754 A     6/2009
(Continued)

OTHER PUBLICATIONS

Jota et al, "How Fast is Fast Enough? A Study of the Effects of Latency in Direct-Pointing Tasks", ACM CHI 2013, pp. 2291-2300, 2013.*

(Continued)

*Primary Examiner* — Kee M Tung
*Assistant Examiner* — Patrick F Valdez
(74) *Attorney, Agent, or Firm* — Lewis Roca Rothgerber Christie LLP

(57) ABSTRACT

A system includes: a display panel; a touch panel; an application processor; a visual accelerator combining video images from the application processor with overlay data in accordance with touch events from the touch panel and parameters from the application processor to supply combined images to the display panel; and memory coupled to the application processor, the memory storing: a request list including acceleration requests; and instructions that, when executed by the application processor, cause the application processor to execute a device driver to: identify an active acceleration request of the acceleration requests, the active acceleration request being associated with an application executed by the application processor; determine an active screen area of the display panel using window arrangement data from a window manager executed by the application processor; generate parameters in accordance with the active (Continued)

acceleration request and the active screen area; and transmit the parameters to the visual accelerator.

20 Claims, 7 Drawing Sheets

(51) Int. Cl.
*G06F 9/451* (2018.01)
*G06F 3/041* (2006.01)
*G06F 3/0484* (2013.01)
*G09G 5/14* (2006.01)
*G09G 5/377* (2006.01)

(52) U.S. Cl.
CPC .......... *G06F 3/04883* (2013.01); *G06F 9/451* (2018.02); *G06T 11/20* (2013.01); *G09G 5/14* (2013.01); *G09G 5/377* (2013.01); *G09G 2340/125* (2013.01); *G09G 2354/00* (2013.01); *G09G 2360/06* (2013.01)

(56) References Cited

U.S. PATENT DOCUMENTS

| | | | |
|---|---|---|---|
| 2010/0271313 A1 | 10/2010 | Low et al. | |
| 2010/0277429 A1 | 11/2010 | Day et al. | |
| 2010/0277505 A1* | 11/2010 | Ludden | G06F 3/0416 345/634 |
| 2011/0310118 A1 | 12/2011 | Asmi et al. | |
| 2013/0201112 A1* | 8/2013 | Large | G06F 3/04883 345/173 |
| 2013/0227419 A1* | 8/2013 | Lee | G06F 9/48 715/728 |
| 2014/0019910 A1* | 1/2014 | Kim | G06F 3/04817 715/810 |
| 2014/0035857 A1* | 2/2014 | Day | G06F 3/0416 345/173 |
| 2014/0143692 A1* | 5/2014 | Wigdor | G06F 3/0488 715/764 |
| 2014/0184517 A1* | 7/2014 | Motta | G06F 3/0488 345/173 |

FOREIGN PATENT DOCUMENTS

| | | |
|---|---|---|
| CN | 102508581 A | 6/2012 |
| EP | 2 620 857 A1 | 7/2013 |
| EP | 2 799 961 A1 | 4/2014 |
| KR | 10-2006-0006272 A | 1/2006 |
| KR | 10-2012-0132560 | 12/2012 |

OTHER PUBLICATIONS

Berard et al, "Two Touch System Latency Estimators: High Accuracy and Low Overhead", ITS'13, pp. 241-250, Oct. 2013.*
European Search Report dated Jun. 23, 2015, Application Serial No. 15152494.9, 5 sheets.
Ng, et al., Designing for Low-Latency Direct-cTouch Input © 2012, ACM 978-1-4503-1580—Jul. 12, 2010, pp. 453-464.
Chinese Office Action in corresponding Chinese Patent Application No. 201510049865.1, dated Oct. 23, 2018, 6 pages.

* cited by examiner

SYSTEM AND METHOD IN MANAGING LOW-LATENCY DIRECT CONTROL FEEDBACK

CROSS-REFERENCE TO RELATED APPLICATION(S)

This application claims priority to and the benefit of U.S. Provisional Patent Application No. 61/933,794, entitled "System and Method in Managing Low-Latency Direct Control Feedback," filed in the United States Patent and Trademark Office on Jan. 30, 2014, the entire disclosure of which is incorporated herein by reference.

BACKGROUND

1. Field

Embodiments of the present invention relate to systems and methods for reducing display lag in computing devices that include touch input and display components.

2. Related Art

Display panels incorporating or coupled to overlaid touch sensor panels provide an interaction system for touch-enabled computing devices (such as mobile phones, tablet computers, laptop computers, or desktop computers). In such computing devices, graphics are displayed on the display panel and a user can interact with these devices by touching the screen (e.g., using an active stylus, a passive stylus, or a body part such as a finger), thereby providing an intuitive user interface.

Touch events detected by the touch sensor panels are typically processed by high level application software running on an application processor (AP) of the device. The many processing operations between the touch sensor panel and the AP and the non-deterministic processing time on the AP (including delays due to other computational tasks being performed by the AP) introduce high levels of latency (e.g., 70 to 100 milliseconds) that reduce responsiveness of the computing device to the user's touch inputs.

SUMMARY

Aspects of embodiments of the present invention are directed to reducing the latency between a touch event and the display response to this touch event.

According to one embodiment of the present invention, a system includes: a display panel; a touch panel; an application processor coupled to the touch panel and the display panel; a visual accelerator combining video images from the application processor with overlay data in accordance with touch events from the touch panel and configuration parameters from the application processor to generate combined images and to supply the combined images to the display panel; and memory coupled to the application processor, the memory storing: a request list including one or more acceleration requests; and instructions that, when executed by the application processor, cause the application processor to execute a device driver to: identify an active acceleration request of the one or more acceleration requests of the request list, the active acceleration request being associated with an application executed by the application processor; determine an active screen area of the display panel in accordance with window arrangement data from a window manager executed by the application processor; generate configuration parameters in accordance with the active acceleration request and the active screen area; and transmit the configuration parameters to the visual accelerator.

The combined images may include a line corresponding to the touch events.

The configuration parameters may include a color, a width, a logical drawing area, and/or a pressure setting, and the visual accelerator may be configured to generate the line in accordance with the configuration parameters.

The instructions may further cause the application processor to execute the device driver to: receive a window event from the window manager; and process the window event to determine the active screen area.

The window event may include window translation, window scaling, window rotation, and/or window focus change.

The instructions may further cause the application processor to execute the device driver to identify the active acceleration request from the one or more acceleration requests of the request list.

The instructions may further cause the application processor to execute the device driver to: create a new acceleration request based on parameters received from the application executed by the application processor; and store the new acceleration request in the request list.

The instructions may further cause the application processor to execute the device driver to update an acceleration request of the one or more acceleration requests of the request list based on parameters supplied by the application.

The instructions may further cause the application processor to execute the device driver to delete an acceleration request of the one or more acceleration requests from the request list.

The instructions may further cause the application processor to execute the device driver to identify, from the request list, another acceleration request of the acceleration requests different from the acceleration request that was deleted from the request list.

According to one embodiment of the present invention, a method for controlling a visual accelerator in a system including: a display panel; a touch panel; an application processor coupled to the touch panel and the display panel; a memory storing a request list including one or more acceleration requests; and the visual accelerator, the visual accelerator being to combine video images from the application processor with overlay data in accordance with touch events from the touch panel and configuration parameters from the application processor to generate combined images and to supply the combined images to the display panel, includes: identifying, by the application processor, an active acceleration request of the one or more acceleration requests of the request list, the active acceleration request being associated with an application executed by the application processor; determining, by the application processor, an active screen area of the display panel in accordance with window arrangement data from a window manager executed by the application processor; generating, by the application processor, configuration parameters in accordance with the active acceleration request and the active screen area; and transmitting, by the application processor, the configuration parameters to the visual accelerator.

The combined images may include a line corresponding to the touch events.

The configuration parameters may include a color, a width, a logical drawing area, and/or a pressure setting, and wherein the visual accelerator is configured to generate the line in accordance with the configuration parameters.

The method may further include: receiving a window event from the window manager; and processing the window event to determine the active screen area.

The window event may include window translation, window scaling, window rotation, and/or window focus change.

The method may further include identifying the active acceleration request from the one or more acceleration requests of the request list.

The method may further include: creating a new acceleration request based on parameters received from the application executed by the application processor; and storing the new acceleration request in the request list.

The method may further include updating an acceleration request of the one or more acceleration requests of the request list based on parameters supplied by the application.

The method may further include deleting an acceleration request of the one or more acceleration requests from the request list.

The method may further include identifying, from the request list, another acceleration request of the acceleration requests different from the acceleration request that was deleted from the request list.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

Figure 1A:
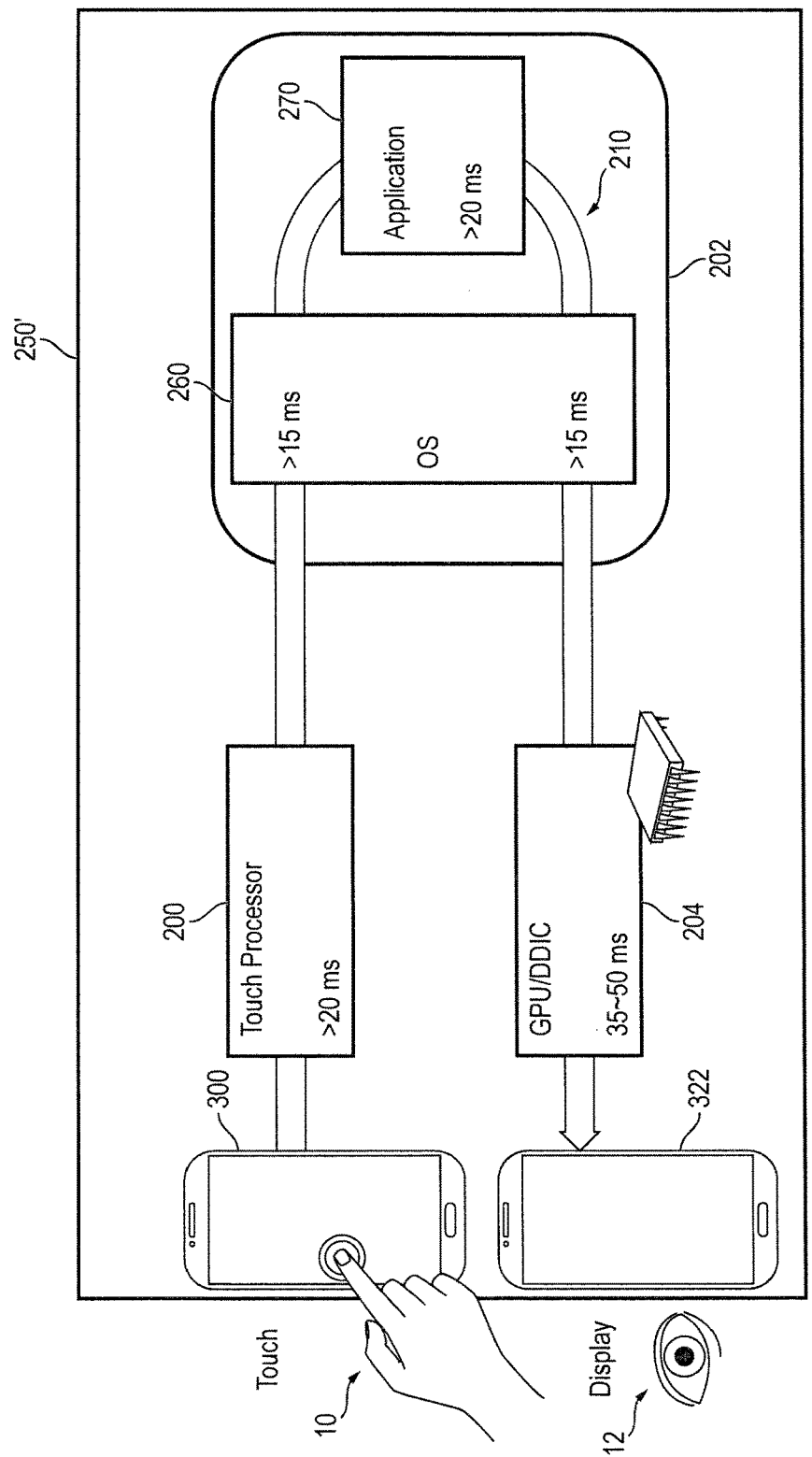
FIG. 1A is a schematic block diagram illustrating various components of an example computing device including a touch panel and a display.

In the following detailed description, only certain exemplary embodiments of the present invention are shown and described, by way of illustration. As those skilled in the art would recognize, the invention may be embodied in many different forms and should not be construed as being limited to the embodiments set forth herein. Like reference numerals designate like elements throughout the specification.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the inventive concept." Also, the term "exemplary" is intended to refer to an example or illustration. As used herein, the terms "use," "using," and "used" may be considered synonymous with the terms "utilize," "utilizing," and "utilized," respectively. When a first element is described as being "coupled" or "connected" to a second element, the first element may be directly "coupled" or "connected" to the second element, or one or more other intervening elements may be located between the first element and the second element.

Embodiments of the present invention allow a user to perceive a faster touch response by displaying an image based on the touch locations in advance of the application processor rendered image.

Software designed for touch interfaces often utilize a metaphor of direct physical manipulation of pseudo "real-world" objects and/or the drawing of paths on the screen to provide visual feedback (e.g., for the trace of a finger on a swiping or gesture-based on-screen keyboard, for the trace of a path in a drawing or sketchbook application, and for a path drawn in a game).

A common issue of mobile phones is the lag (or lag time or latency) of the user interface (UI). Current mobile phones typically take 50 to 200 milliseconds to update the display in response to a touch action. For example, the typical display response time to a touch event as measured on a related art smart phone may be more than 100 milliseconds or roughly over 6 frames of video images, based on a refresh rate of 60 frames per second (FPS), which is noticeable by a large portion of users.

In related art touch and stylus-based drawing applications (e.g., SMemo and SNote), touch events are delivered to the drawing applications 270 through multiple stages. For example, FIG. 1A is a schematic block diagram illustrating various components of an example computing device 250' including a touch panel and a display. As shown in FIG. 1A, a user's touch of a touch panel 300 via an implement 10 (e.g., a hand, a finger, a stylus, etc.) generates touch signals that are analyzed by a touch processor 200. The touch processor 200 generates touch events that are sent to an application processor (AP) 202 running an operating system (OS) 260. The touch events may also be supplied to an application (or app) 270 which processes the input and which may generate feedback such as painting a line in the display or depressing a button. The feedback data is supplied to the OS 260, which supplies video images to a graphical processing unit (GPU) and display device interface controller (DDIC) 204, which generates driving signals to drive a display panel 322 to display the images to a user's eyes 12.

As illustrated in FIG. 1A, each stage of processing can introduce delays. For example, the touch processor 200 may spend 20 ms processing the touch signals, the operating system 260 may spend an additional 15 ms processing the touch events, and the application may spend another 20 ms in generating feedback. Returning the feedback to the display panel 322, the operating system 260 may spend 15 ms processing the graphics commands, and the GPU and DDIC 204 may spend 35-50 ms rendering the video images onto the display. As such, in typical smartphones and tablets there may be over 100 ms of delay in a display response to a user's touching the touch panel.

Figure 1B:
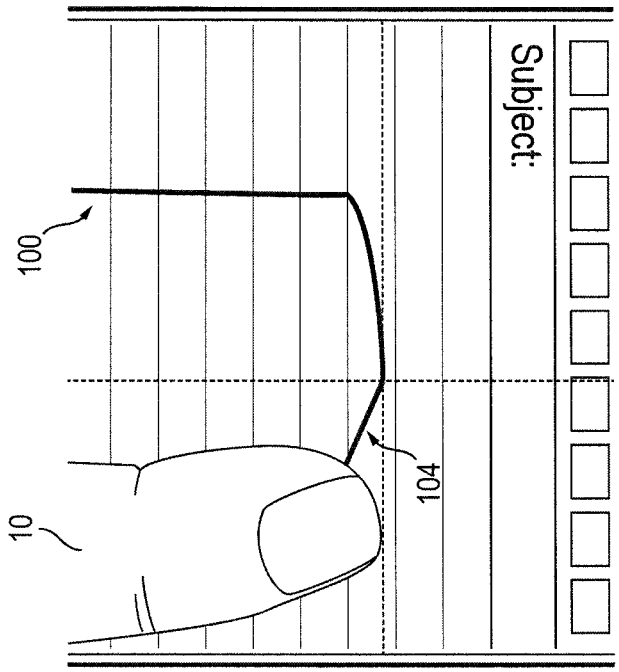
FIG. 1B illustrates the response of a device including a related art touch input processing device.

FIG. 1B illustrates the response of a device including a related art touch input processing device, where the displayed line 100 has a gap 102 between the position of a finger and the last drawn portion of the displayed line 100, thereby causing noticeable display lag between the user's touch 10 and the displayed line 100. Similar display lag is also typically encountered when using a stylus, whether active or passive.

Embodiments of the present invention allow the user to perceive a faster touch response by overlaying an image in the touch path in advance of the AP rendered image. Embodiments of the present invention decrease the perceived lag time by closing the gap between the user's touch point and the drawing of the line. As used herein, the term "overlay" when used as a verb refers to combining video images (e.g., a AP rendered image) and additional image data such that the additional image data replaces (or "overlays") some portion of the original video images. The term "overlay" when used as a noun may also refer to the appearance of that additional image data in the combined display image.

In addition, by using an overlay method, application software can also control the region (e.g., location on the display), color, and rendering operation of the displayed response to a touch event.

Figure 1C:
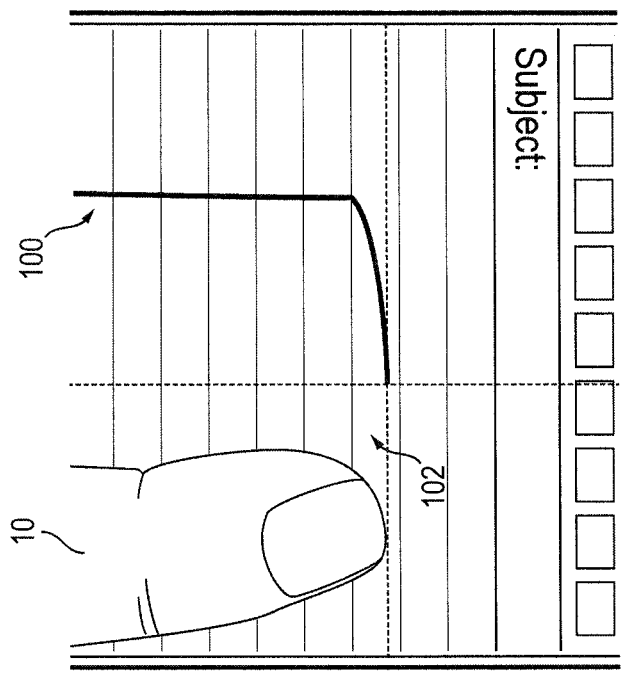
FIG. 1C illustrates the displayed response of a device including a touch input processing device according to embodiments of the present invention.

FIG. 1C illustrates the displayed response of a device including a touch input processing device according to embodiments of the present invention. In this example, the displayed line includes an estimated or computed portion 104 that is drawn by a low latency overlay system according to embodiments of the present invention. The inclusion of the estimated or computed portion 104 reduces the display lag perceived by the user.

Figure 1D:
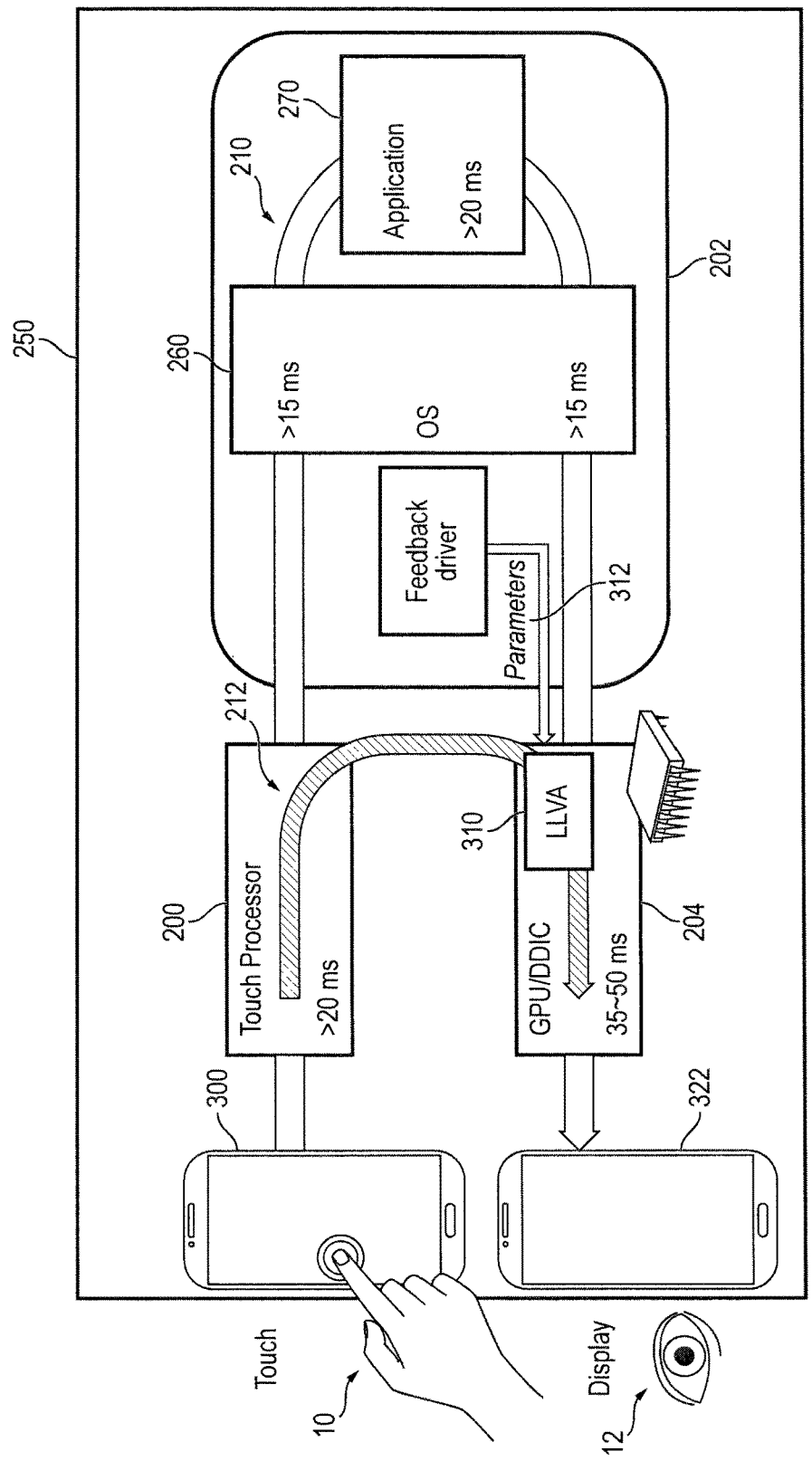
FIG. 1D is a schematic block diagram illustrating a computing device according to one embodiment of the present invention.

One way of improving this latency is shown in FIG. 1D, which is a schematic block diagram illustrating a computing device 250 substantially similar to computing device 250' but further including a low latency visual accelerator (LLVA) 310 (which may be integrated into the GPU/DDIC 204). The AP 202 may further execute or run a feedback driver 280 in order to interact with and control the LLVA 310 in accordance with instructions from the OS 260 and/or an application 270. The LLVA 310 provides visual feedback to the display panel 322 much more quickly over the low latency path 212, thereby reducing display lag. The appearance of the visual feedback may be controlled by parameters 312 supplied to the LLVA 310. The parameters 312 may set, for example, the color, thickness, shape, style, and/or other aspects of the visual feedback.

Figure 1G:
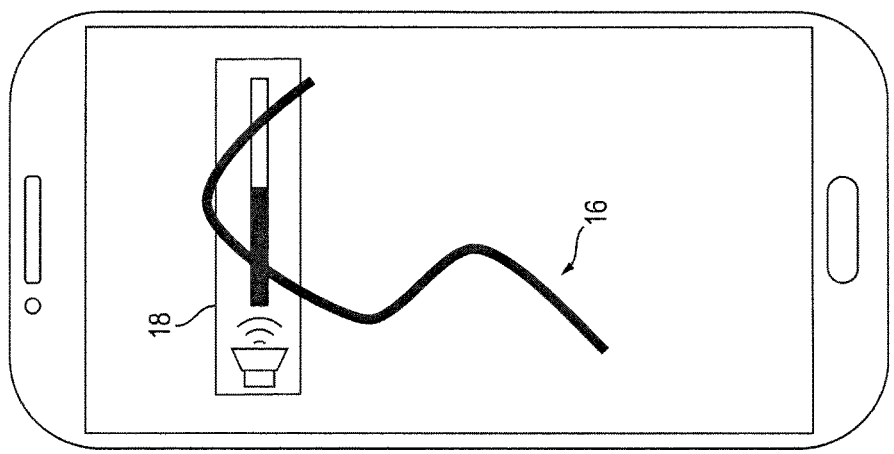
FIGS. 1E, 1F, and 1G are schematic illustrations of a drawing application in which a curved line is drawn on a device.
Figure 1F:
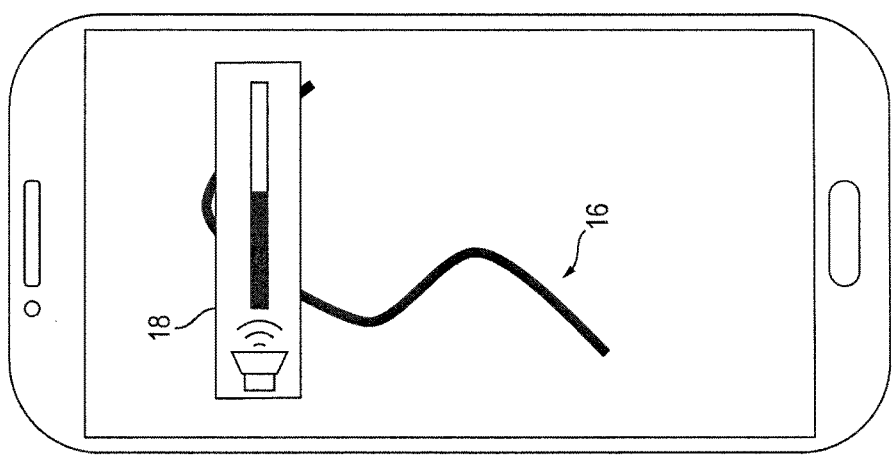
Figure 1E:
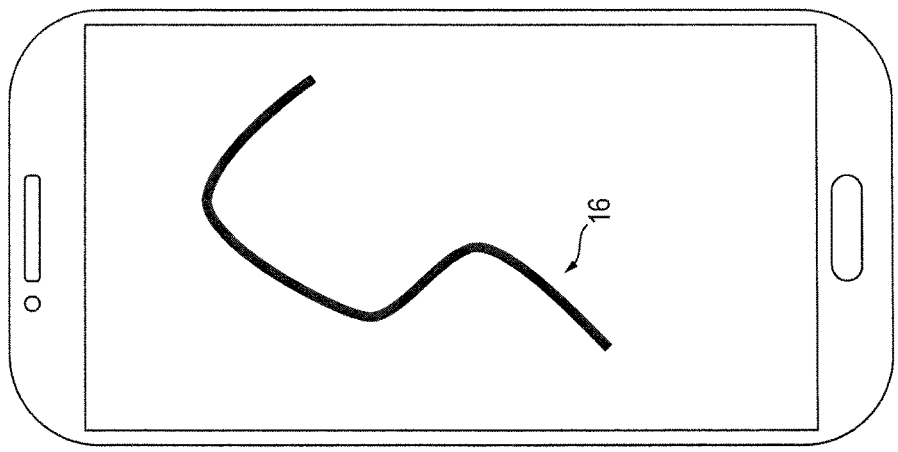

FIGS. 1E, 1F, and 1G are schematic illustrations of a drawing application in which a curved line 16 is drawn on a device. FIG. 1E illustrates an initial state in which the curved line 16 is traced in an example drawing application. FIG. 1F illustrates a state in which a window 18 (in this example, a volume control) is displayed on top of the drawing application, thereby hiding or occluding a portion of the curved line 16. However, as shown in FIG. 1G, the LLVA 310, in some circumstances, may inadvertently overlay a line on top of the window 18, thereby resulting in visual artifacts (e.g., in this instance, the volume control should be on top of the curved line 16, as shown in FIG. 1F). In order to address these artifacts, aspects of embodiments of the present invention define and provide an interface between the LLVA 310 and window manager 262 (e.g., for controlling the LLVA 310 in accordance with information from the window manager 262).

Generally speaking, application controls are single event calls that do not last long, for example, a call to a camera to shoot a picture. The corresponding component device driver passes control signals to the hardware component sequentially. For a system having multiple applications running at the same time, a long-duration event may behave inconsistently depending on how it is programmed. For example, a user may first turn the speaker volume to high while using Application A, and may then turn the speaker volume down while using Application B, and then goes back to Application A again. After this sequence of events, one could ask whether the speaker volume should be high or low. In many circumstances, this depends on how Application A was programmed. If Application A does nothing, the speaker will stay at a low volume. On the other hand, an experienced programmer may choose to keep a registered value of the current volume status for his application and add a focus-callback function to reset the volume to the stored value every time Application A regains focus. In this case, the volume will be high when the user switches back to Application A.

This architecture causes similar problems in a low-latency feedback mechanism for touch and stylus input for current mobile devices because the visual accelerations are device enhancements that are transparent to applications and thus callback functions cannot be inserted. However, the acceleration modes will change according to application behaviors. For example, the acceleration mode will change based on whether the acceleration is used for line drawing (e.g., the color, shape, width and other features of the line may change), on screen keyboard tapping, and icon movement.

As such, aspects of embodiments of the present invention are directed to a method to manage the application-specific device configuration parameters within the device driver service in a manner that is transparent to applications 270 running on the computing device 250.

As such, one aspect of embodiments of the present invention relates to a service that resides in the host device to automatically switch the operation modes of all peripheral input and output components according to the in-focus application of all active applications.

Another aspect of embodiments of the present invention relates to a service that resides in the host device to automatically determine the active screen area of the active window canvas of the in-focus application including elimination all active window canvases that are on the top of this in-focus canvas.

Still another aspect of embodiments of the present invention relates to service that resides in the host device to manage output data and control signals to output components directly from input signals according to the specific operation mode.

One example of embodiments of the present invention will be described below in relation to a software system that allows applications to take advantage of the low latency visual accelerator (LLVA, or simply VA) hardware without significant modifications to the application source code. In some embodiments of the present invention, no modification to the application source code is required if the application uses the default mode of the visual accelerator. In addition, multiple applications can use the LLVA hardware 310 through the LLVA Driver 280.

Figure 2:
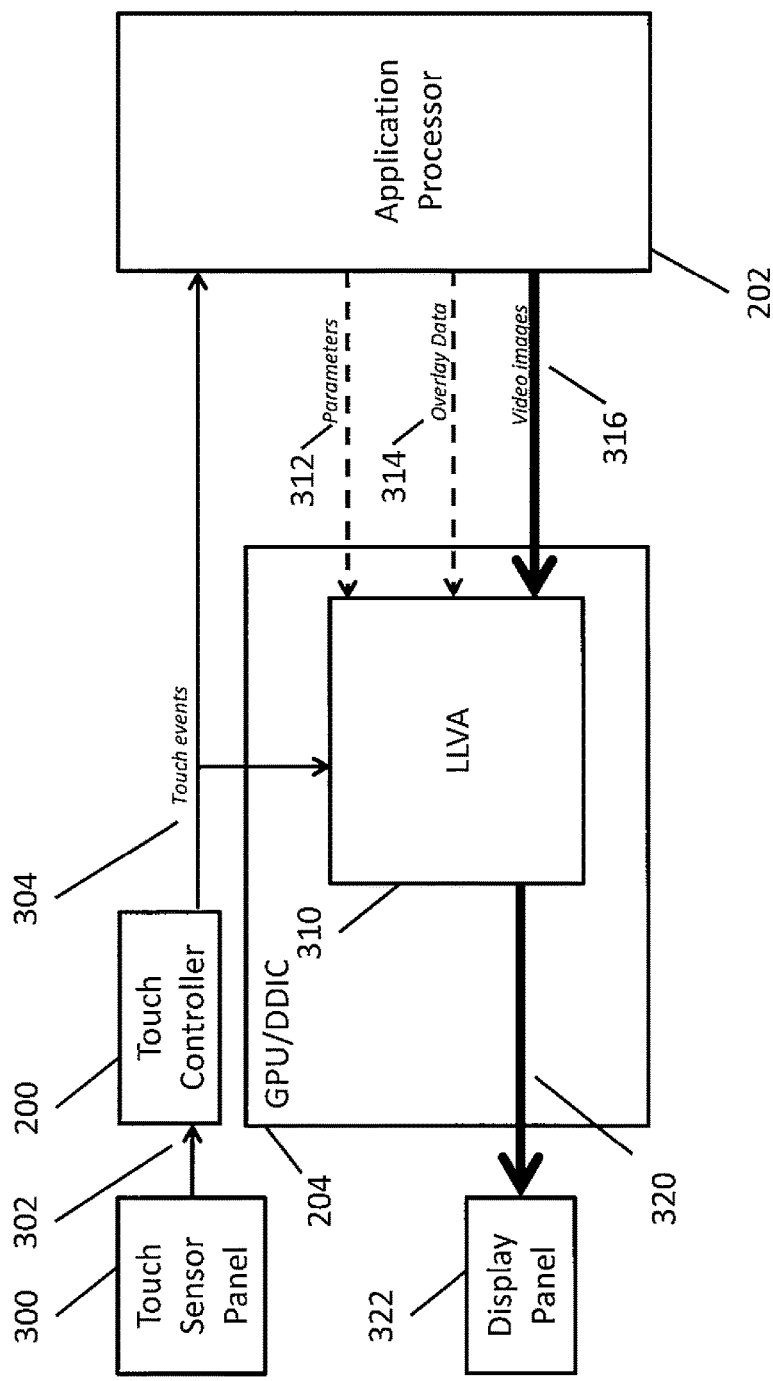
FIG. 2 is a block diagram schematically illustrating a low latency visual accelerator according to one embodiment of the present invention.

FIG. 2 is a block diagram schematically illustrating the LLVA 310 according to one embodiment of the present invention. Referring to FIG. 2, as discussed with reference to FIG. 1D above, a touch controller 200 processes the touch signals 302 from a touch sensor panel 300 and outputs the touch events 304, such as coordinates, to the application processor (AP) 202.

Still referring to FIG. 2, a touch sensor panel 300 is configured to detect a user's touches and generates touch signals 302 which are supplied to the touch controller 200 over a data bus. Embodiments of the invention can be used with touch sensor panels 300 that detect user's touch using any type (or kind) of pointing implement, such as a body part (e.g., a finger), a stylus, etc. As used herein, the term "pointing implement" refers to objects that can be detected by a touch sensor panel 300 including devices (such as an active stylus or a passive stylus) and body parts (such as a finger or a hand). Embodiments of the present invention can be used with any of a variety of types (or kinds) of touch input panels such as resistive touch panels, surface acoustic wave touch panels, capacitive touch panels, infrared touch panels, or optical touch panels. In one embodiment, touch signals 302 correspond to the raw data supplied by the touch sensor panel 300, such as measurements of capacitance or voltage or current for each location in the touch sensor panel. The data bus for the touch events 304 is connected to both the AP 202 and the low-latency visual accelerator 310. The touch events 304 may be a stream of data values corresponding to locations at which touches by a user were detected (e.g., changes of capacitance or voltage or current of sufficiently high value to constitute the detection of a touch event). In some embodiments, the touch events 304 include pressure data indicating the amount of pressure that was applied to the touch sensor panel 300 at each touch event.

The AP 202 processes the touch events 304, and application software running from the AP 202 updates the display composition accordingly, by rendering video images 316 (or frames or video images) to the DDIC 204 for displaying on a display panel 322. The AP 202 may include a central processing unit (CPU) and memory. The display panel 322 may be, for example, an organic light emitting diode (OLED) display panel or a liquid crystal display (LCD) panel. Although the GPU 204 is depicted as a component separate from the AP 202 in FIGS. 1A, 1D, and FIG. 2, embodiments of the present invention are not limited thereto and, in some embodiments, the GPU and the LLVA may be integrated as a components of the AP 202 (e.g., on the same chip as the AP 202).

The AP 202 is connected to a GPU/DDIC 204 which, in turn, is connected to the display panel 322. The GPU/DDIC 204 receives the video images 316 from the AP 202 and supplies pixel driving signals 320 to the display panel 322.

In one embodiment, the touch sensor panel 300, the touch controller 200, the DDIC 204, and the display panel 322 are all components of a display module, which may be separate from the AP 202. In another embodiment, the touch sensor panel 300, the touch controller 200, the DDIC 204, and the display panel 322, or combinations thereof, may reside in separate modules, or be combined with the AP 202.

The DDIC 204 processes the video images (or frames of video images) 316 received from the AP 202, and outputs pixel driving signals 320 to the display panel 322.

The functions of the parameter 312 and the overlay data 314 will be described in more detail below.

Systems and methods for low latency visual acceleration are described in more detail in, for example, U.S. patent application Ser. No. 14/226,776 "Method and Apparatus to Reduce Display Lag Using Image Overlay" filed in the United States Patent and Trademark Office on Mar. 26, 2014, U.S. patent application Ser. No. 14/303,457 "Method and Apparatus to Reduce Display Lag of Soft Keyboard Presses" filed in the United States Patent and Trademark Office on Jun. 12, 2014, and U.S. patent application Ser. No. 14/489,200 "Integrated Input Control and Output Display System" filed in the United States Patent and Trademark Office on Aug. 12, 2014, the entire disclosures of all of which are incorporated herein by reference.

Embodiments of the present invention will be described in the context of a computing device running the Google® Android® operating system. This invention discloses functionality and interfaces of the Feedback Driver (LLVA Driver) 280. However, it should be understood that a similar software architecture can be implemented on other operating systems including Microsoft® Windows®, Apple® iOS®, Samsung® Tizen®, and so on.

The application processor 202 may be any type (or kind) of processor generally used in computing devices such as microprocessors or microcontrollers based on, for example, Intel x86 or ARM architectures.

Figure 3:
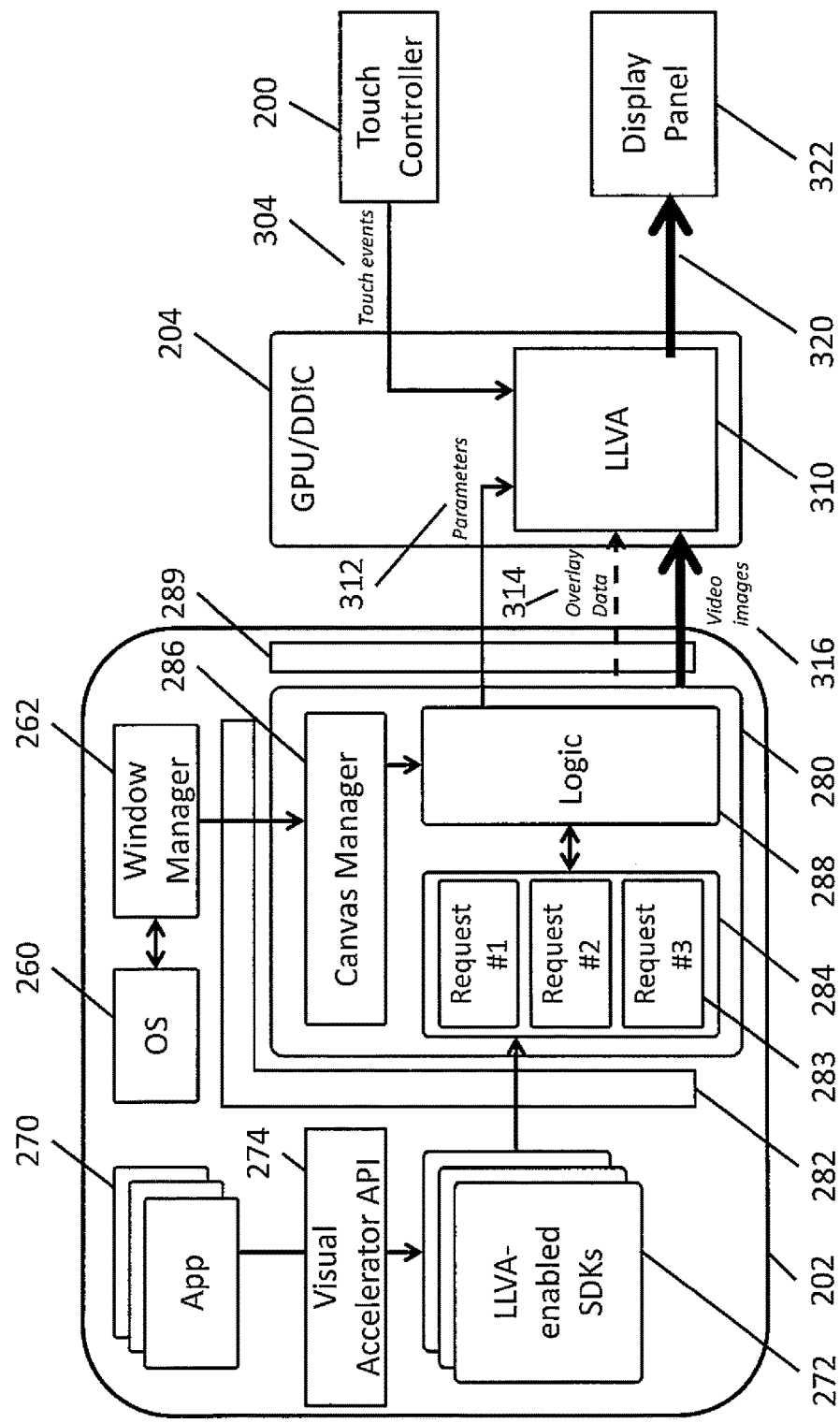
FIG. 3 is a block diagram illustrating the overall software architecture of a system according to one embodiment of the present invention.

FIG. 3 is a block diagram illustrating the overall software architecture of a system according to one embodiment of the present invention. Individual applications 270 running on the AP 202 may interact with the LLVA driver 280 through a visual accelerator API 274, which may communicate with the driver through an LLVA-enabled SDK 272 and associated software libraries.

Visual Accelerator API 274 for applications is optional and when used, includes functions that allow applications to discover, enable, and disable LLVA. In one embodiment, three types (or kinds) of functions are used:

int isVisualAcceleratorAvailable( )
    returns 0 for not available, or the index of the current visual accelerator hardware version id.
    bool enableVisualAccelerator (int Mode=0)
    returns 0 for fail, or 1 for success. This function can also be used to check the availability of specific acceleration feature.
    bool disableVisualAccelerator (int Mode=0)
    returns 0 for no state change, or 1 for successful disabling.

In one embodiment, the "Mode" supplied in the enableVisualAccelerator and disableVisualAccelerator functions is one of the constants assigned to individual acceleration modes, predefined groups of acceleration modes, and the default value is 0 for all currently supported modes.

While, in some embodiments, it is possible for applications to implement drawing logic internally, in other embodiments of the present invention, this functionality is delegated to Software Development Kits (SDKs) and application libraries 272 as shown in FIG. 3. In this situation the libraries that contain actual implementations of drawing (and other accelerated by LLVA) functions will be invoking the visual accelerator hardware abstraction layer interface 282 to the LLVA Driver 280. According to one embodiment of the present invention, a main interface function for LLVA Driver is:

int setVisualAccelerator (cfg)
    where cfg will contain a request for hardware acceleration.

A request or "acceleration request" ("cfg") encapsulates configuration information about the acceleration. The acceleration request includes, for example, (logical) drawing parameters (e.g., pixel format, drawing area, type, color, and/or width of lines); touch-related parameters (e.g., duration of touch event history, type, and ID of touch events, use of pressure, and/or the ID of the application). The LLVA Driver 280 will accept the request and return a unique integer visual accelerator ID (or VAID) to the application library 272 that can be used later to cancel a particular request for acceleration when the application is closed or when acceleration is no longer desired.

The LLVA Driver 280 maintains all acceleration requests 283 in a request list 284. When an application 270 creates, updates, or deletes acceleration requests in the LLVA driver 280 (e.g., by way of the visual accelerator API 274 and the LLVA-enabled SDKs 272), the acceleration requests 283 are added, updated, or deleted in the request list 284.

The LLVA Driver also includes a canvas manager 286 having logic to resolve windows geometry, orientation, zoom and focus on display by registering listeners in the window manager 262 of the operating system 260, where the window manager 262 is system software that controls the placement and appearance of windows in a graphical user interface and provides window arrangement data (e.g., the positions and visibility of the windows of various applications 270) to the canvas manager 286.

The LLVA Driver also includes logic 288 configured to: set active configuration for LLVA hardware 310; create, update, and delete acceleration requests 283 in the request list 284; register listeners to the OS window manager 262 for all applications that have visual acceleration requests 283 in the list 284; and calculate the active screen area for requests 283 by factoring in occluding windows and taking into account zoom and orientation using information from the canvas manager 286 and the window manager 262, as described in more detail below.

Based on information about the currently active application and active screen area information received from the window manager 262 and the canvas manager 286, the logic identifies a matching request 283 from the request list 284 and supplies the configuration parameters 312 from the matching request 283 to the LLVA hardware 310 via visual accelerator hardware interface 289. Additional overlay data 314 may also be supplied to the LLVA 310. The LLVA 310 then combines the overlay data 314 with the video images 316 in accordance with the configuration parameters 312 and the received touch events 304 to generate combined images that are supplied as driving signals 320 to the display panel 322.

Figure 4:
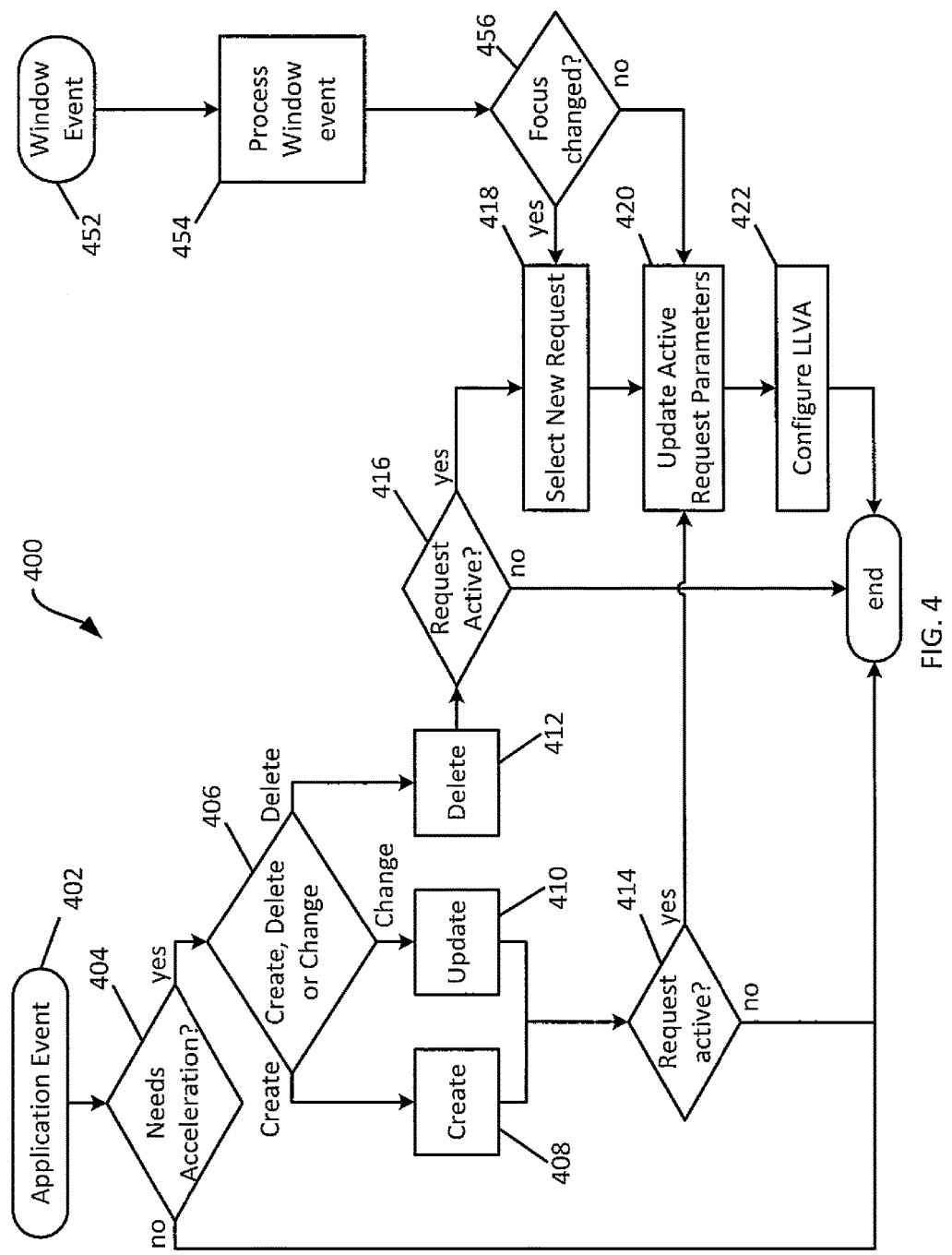
FIG. 4 is a flowchart illustrating the operation 400 of the LLVA Driver 280 according to one embodiment of the present invention.

FIG. 4 is a flowchart illustrating the operation 400 of the LLVA Driver 280 according to one embodiment of the present invention. The LLVA Driver 280 responds to two types (or kinds) of events: Application Events 402 and Window Events 452. Application Events 402 refer to events that create, delete, and change the behavior of a drawing application. Behavior changes include, among others, change of a color or line width for drawing, modifying line style, and similar actions. Window Events 452 refer to changes in window arrangement (such as changing the active window, moving, resizing and/or rotating windows, or similar actions). Application events 402 are reported to the LLVA driver 280 by the application 270 and its libraries 272. Window events 452 are reported to the LLVA driver 280 by the listeners that are registered by the LLVA Driver 280 with the window manager 262 upon creation of new requests.

When an application event 402 is received, the LLVA Driver logic 288 determines in operation 404 whether the event requires acceleration. If not, then nothing more needs to be done and the process ends. If acceleration is needed, then in operation 406 it is determined whether the event is one that results in the creation, deletion, or change in the behavior of the application. For example, if the event requires the creation of a new request, then in operation 408 a request containing the parameters (e.g., line style, color, pressure sensitivity, etc.) is created and added to the request list 284. Alternatively, if the event requires the updating of a request (e.g., to change the appearance of the line) then in operation 410 the request is identified from the request list 284 and updated.

When a new request is created or an existing request is updated, the flow proceeds with operation 414 in which the logic 288 determines whether the request is active (e.g., whether the requesting application 270 has focus and which portions of the requesting application 270 are visible on the display). If not, then nothing more needs to be done and the process ends. If the request is active, then in operation 420 the active request parameters are updated and in operation 422 the LLVA is configured by transmitting the parameters to the LLVA 310 so that visual acceleration can be performed for the requesting application 270 in an appropriate portion of the screen.

If the application event caused the deletion of a request, then in operation 412 the identified request is removed from the request list 284 and in operation 416 the logic 288 determines whether or not the deleted request was active. If the request was not active, then the process ends. If the request was active, then a new request from the request list 284 is selected, if applicable in operation 418. After selecting the new request, the parameters are set in operation 420 and the LLVA 310 is configured, as discussed above, and the process ends.

Still referring to FIG. 4, when a window event 452 is received, the window event is processed by the canvas manager 286 in operation 454 to determine which portions of the various applications are visible based on the changes in the window arrangement ("active screen area").

The active screen area may take on any of a variety of shapes in accordance with which portions of an active window are visible. For example, if the entire active window is visible, then the active screen area may be a rectangle covering a large portion of the screen. If any one corner of the active window is blocked by another window, then the active screen area may be "L" shaped. If a blocking window is contained entirely within the active window, then the active screen area may include a hole. In addition, if there are multiple blocking windows on top of the active window, then the active screen area may have a more complex shape.

Furthermore, in many applications the active drawing region may only encompass a logical drawing area within the application because some portions of the application window may be covered by user interface elements (such as title bars, graphics, brush configuration settings, color palettes, etc.) and/or because there may be other inactive windows (e.g., other document windows) within the application that should not receive acceleration.

In operation 456, the logic 288 determines whether or not the focus has changed (e.g., whether a different application 270 is now active). If it is, then a new request corresponding to the active application is selected from the request list 284, assuming the currently active application 270 has such a request registered. If the focus has not changed, then no new request needs to be selected. Whether or not the focus has changed, the flow then proceeds with the parameters being set in operation 420 and the LLVA 310 being configured, as discussed above, and the process then ends.

With the LLVA 310 configured based on the parameters supplied from the LLVA Driver 280, the LLVA 310 can combine overlay data with the video images 316 received from the AP 202 in accordance with the touch events 304 received from the touch controller 200. For example, when drawing a curved line on the screen, the LLVA 310 may generate overlay data in accordance with the parameters (e.g., of a particular color, width, and/or style) and output the overlay data instead of the video images 316 in portions of the combined image corresponding to the locations of the touch events. In addition, the parameters may include a pressure setting which provides a function or other mapping from the pressure detected at each touch point to the width of the line to be drawn. For example, a pressure setting may multiply the pressure at each touch point by a scaling factor such that higher pressure points correspond to a wider line and lighter pressure points correspond to a narrower line. The pressure setting may also be a different mathematical function (such as a polynomial) so that the width of the line changes in a different manner with respect to the detected pressure at each touch event.

In other embodiments of the present invention, the LLVA 310 provides accelerated feedback in shapes other than a line. For example, in one embodiment the LLVA 310 may draw a rectangle having one corner corresponding to the location of the latest touch event so that selection boxes are quickly drawn on the screen with reduced lag. Furthermore, in some embodiments of the present invention, the interior of the selection box may show the pixels of the underlying video images as modified by a filter (e.g., changing the color, saturation, or brightness) of the pixels within the selection box. Furthermore, in some embodiments of the present invention, the LLVA 310 can use overlay data 314 provided as images or other visual elements to draw on the underlying video data.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A system comprising:
   a display panel;
   a touch panel;
   an application processor coupled to the touch panel and the display panel;
   a visual accelerator combining video images from the application processor with overlay data in accordance with touch events from the touch panel and configuration parameters from the application processor to generate combined images and to supply the combined images to the display panel; and
   memory coupled to the application processor, the memory storing:
      a request list comprising one or more acceleration requests, the one or more acceleration requests comprising:
         a first acceleration request associated with a first application executed by the application processor; and
         a second acceleration request associated with a second application executed by the application processor; and
      instructions that, when executed by the application processor, cause the application processor to execute a device driver to:
         receive information identifying an active application executed by the application processor, the active application being one application of a group comprising the first application and the second application;
         identify an active acceleration request of the one or more acceleration requests of the request list based on the information identifying, from among the first application and the second application, the active application executed by the application processor;
         select the identified active acceleration request;
         determine an active screen area of the display panel in accordance with window arrangement data from a window manager executed by the application processor;
         generate configuration parameters in accordance with the identified active acceleration request corresponding to the active application and the active screen area; and
         transmit the configuration parameters to the visual accelerator.

2. The system of claim 1, wherein the combined images comprise a line corresponding to the touch events.

3. The system of claim 2, wherein the configuration parameters comprise a color, a width, a logical drawing area, and/or a pressure setting, and
   wherein the visual accelerator is configured to generate the line in accordance with the configuration parameters.

4. The system of claim 1, wherein the instructions further cause the application processor to execute the device driver further to:
   receive a window event from the window manager; and
   process the window event to determine the active screen area.

5. The system of claim 4, wherein the window event comprises window translation, window scaling, window rotation, and/or window focus change.

6. The system of claim 5, wherein the window event comprises a focus change.

7. The system of claim 1, wherein the instructions further cause the application processor to execute the device driver further to:
   create a new acceleration request based on parameters received from the application executed by the application processor; and
   store the new acceleration request in the request list.

8. The system of claim 1, wherein the instructions further cause the application processor to execute the device driver further to update an acceleration request of the one or more acceleration requests of the request list based on parameters supplied by the application.

9. The system of claim 1, wherein the instructions further cause the application processor to execute the device driver further to:
   delete an acceleration request of the one or more acceleration requests from the request list.

10. The system of claim 9, wherein the instructions further cause the application processor to execute the device driver further to identify, from the request list, another acceleration request of the acceleration requests different from the acceleration request that was deleted from the request list.

11. A method for controlling a visual accelerator in a system comprising: a display panel; a touch panel; an application processor coupled to the touch panel and the display panel; a memory storing a request list comprising one or more acceleration requests, the one or more acceleration requests comprising a first acceleration request associated with a first application executed by the application processor; and a second acceleration request associated with a second application executed by the application processor; and the visual accelerator, the visual accelerator being configured to combine video images from the application processor with overlay data in accordance with touch events from the touch panel and configuration parameters from the application processor to generate combined images and to supply the combined images to the display panel, the method comprising:

receiving, by the application processor, information identifying an active application executed by the application processor, the active application being one application of a group comprising the first application and the second application;

identifying, by the application processor, an active acceleration request of the one or more acceleration requests of the request list based on the information identifying, from among the first application and the second application, the active application executed by the application processor;

selecting, by the application processor, the identified active acceleration request;

determining, by the application processor, an active screen area of the display panel in accordance with window arrangement data from a window manager executed by the application processor;

generating, by the application processor, configuration parameters in accordance with the identified active acceleration request corresponding to the active application and the active screen area; and transmitting, by the application processor, the configuration parameters to the visual accelerator.

12. The method of claim 11, wherein the combined images comprise a line corresponding to the touch events.

13. The method of claim 12, wherein the configuration parameters comprise a color, a width, a logical drawing area, and/or a pressure setting, and wherein the visual accelerator is configured to generate the line in accordance with the configuration parameters.

14. The method of claim 11, further comprising:

receiving a window event from the window manager; and processing the window event to determine the active screen area.

15. The method of claim 14, wherein the window event comprises window translation, window scaling, window rotation, and/or window focus change.

16. The method of claim 15, wherein the window event comprises a focus change.

17. The method of claim 11, further comprising:

creating a new acceleration request based on parameters received from the application executed by the application processor; and storing the new acceleration request in the request list.

18. The method of claim 11, further comprising updating an acceleration request of the acceleration requests based on parameters supplied by the application.

19. The method of claim 11, further comprising deleting an acceleration request of the one or more acceleration requests from the request list.

20. The method of claim 19, further comprising identifying, from the request list, another acceleration request of the acceleration requests different from the acceleration request that was deleted from the request list.

* * * * *